Nov. 10, 1953 W. KRZESIEWSKI 2,658,666
FAN GUARD
Filed Dec. 14, 1950 2 Sheets-Sheet 1
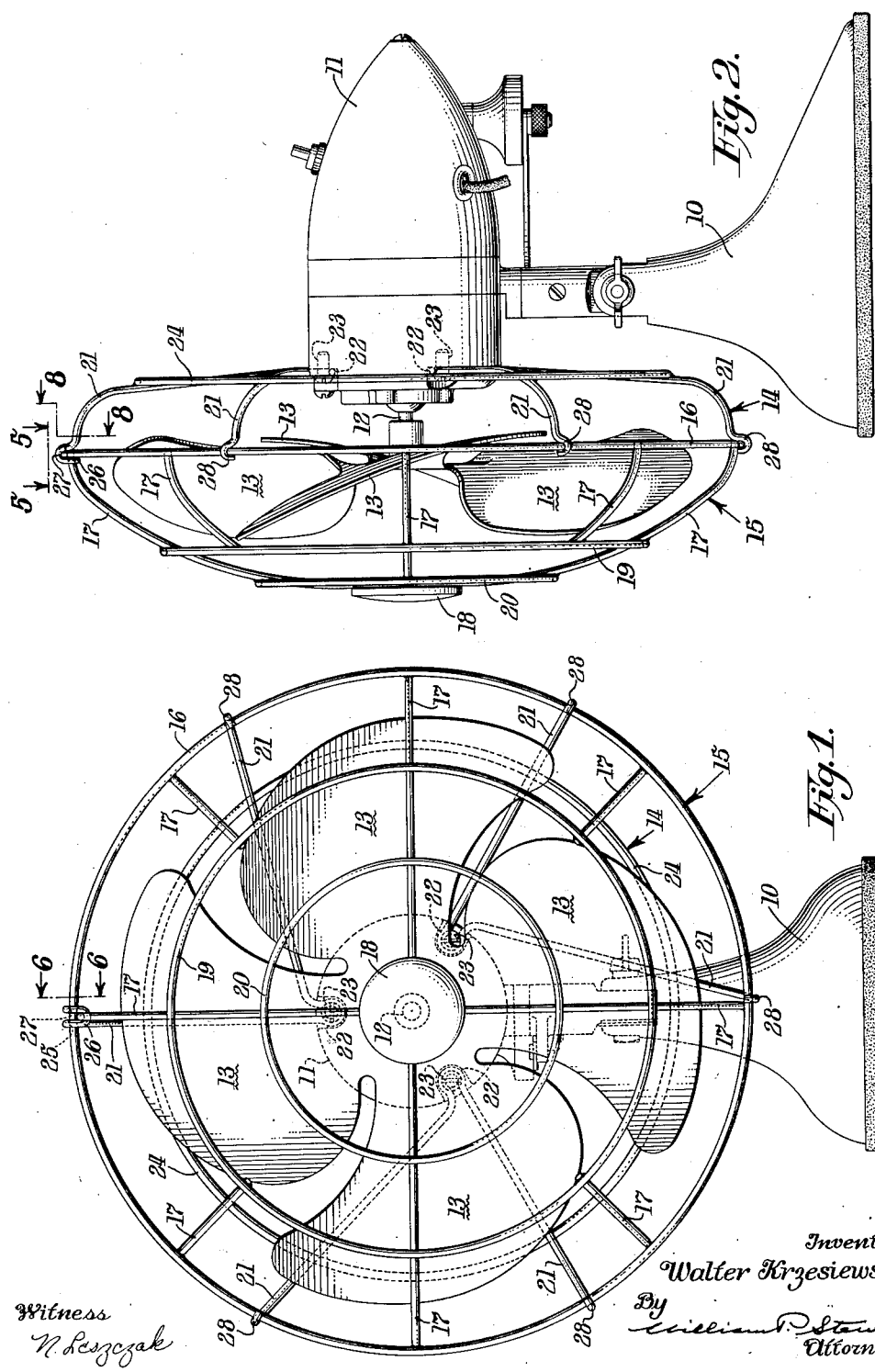
Witness
N. Leszczak
Inventor.
Walter Krzesiewski
By
William P. Stewart
Attorney Nov. 10, 1953   W. KRZESIEWSKI   2,658,666
FAN GUARD
Filed Dec. 14, 1950   2 Sheets-Sheet 2
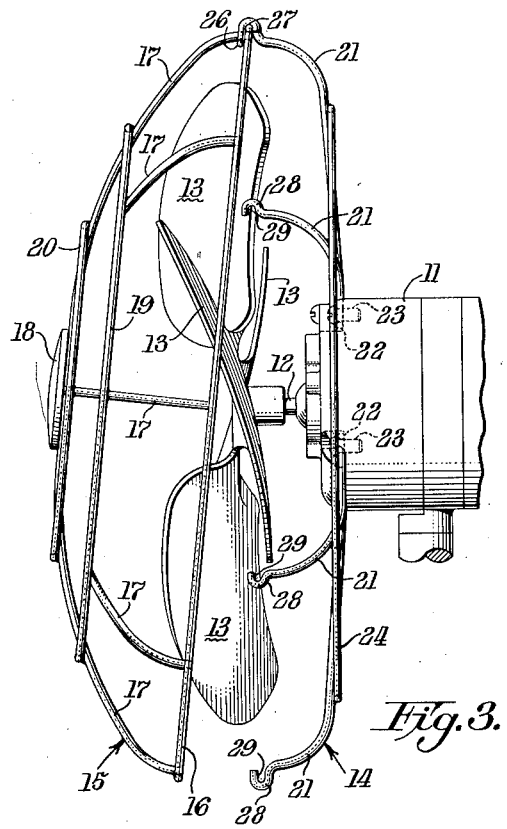
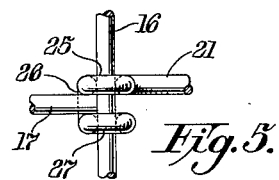
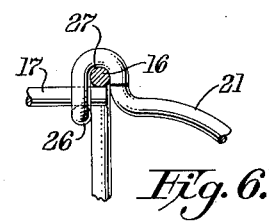
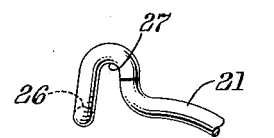
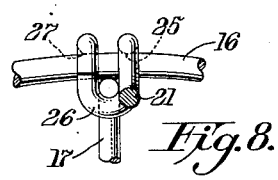
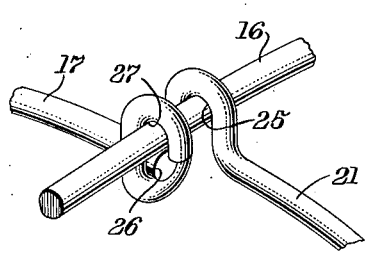
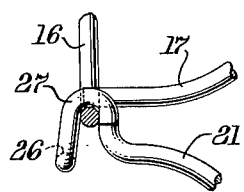
Inventor.
Walter Krzesiewski
Witness
N. Lszczak
By
William P. Stewart
Attorney Patented Nov. 10, 1953

2,658,666

UNITED STATES PATENT OFFICE 2,658,666

FAN GUARD

Walter Krzesiewski, Manville, N. J., assignor to The Singer Manufacturing Company, Elizabeth, N. J., a corporation of New Jersey Application December 14, 1950, Serial No. 200,730

3 Claims. (Cl. 230—259)

This invention relates to a guard construction for motor-driven fans, blowers and the like devices.

It is a primary object of the present invention to provide an improved fan guard which may be inexpensively manufactured and expeditiously assembled to a fan structure.

With the above and other objects in view, as will hereinafter appear, the invention comprises the devices, combinations and arrangements of parts hereinafter set forth and illustrated in the accompanying drawings of a preferred embodiment of the invention, and the advantages attained thereby will be readily understood by those skilled in the art.

In the drawings:

Fig. 1 represents a front elevational view of a fan unit in which the present fan-guard construction is incorporated.

Fig. 2 represents a side elevational view of the unit disclosed in Fig. 1.

Fig. 3 represents a fragmentary side elevational view of the fan with the support portion of the fan guard secured directly to the motor and with the cage portion of the guard being pivotally carried by the guard-support.

Fig. 4 represents a fragmentary perspective view of a portion of the fan guard and it illustrates the manner in which the fan-guard cage is pivotally supported upon the guard-support.

Fig. 5 represents an enlarged fragmentary view taken substantially along the line 5—5 of Fig. 2.

Fig. 6 represents an enlarged sectional view taken substantially along the line 6—6 of Fig. 1.

Fig. 7 represents a side view of a hinge element employed in the present fan guard.

Fig. 8 represents an enlarged fragmentary sectional view taken substantially along the line 8—8 of Fig. 2.

Fig. 9 represents a view similar to Fig. 6 but illustrating the manner in which the cage is disengaged from the hinge arm.

Referring more specifically to the drawings, the invention is disclosed as applied to an electric fan having a base 10 upon which is mounted the usual motor casing 11, containing an electric motor, the forward end of the shaft 12 of which carries fan blades 13. In accordance with my invention, the guard is formed of two parts, generally designated by the numerals 14 and 15, the former defining a guard-support and the latter a guard-cage encompassing the blades 13. Both the guard-support 14 and the guard-cage 15 are preferably made as unitary devices which are adapted to be removably secured together. This construction facilitates the nesting together of the separate units so as to reduce the cost of shipping the same from the guard manufacturer to the guard assembler.

The guard-cage 15 is formed substantially in the shape of a bowl and comprises an annular rim or ring 16 preferably formed of round wire of suitable gauge. Connected to the rim 16, as by welding, are the outer end portions of a plurality of substantially radially disposed round wire members, each of which is generally designated by the numeral 17. The inner end portions of some of these wires 17 are each connected to a center hub or button 18 while the inner end portions of the remaining wire members 17 are suitably secured to a second annular ring 19 which, in turn, is secured to the intermediate portions of the first mentioned radial members 17. To complete the cage member, a third annular ring 20 is secured to several of the radial members 17. From this, it will be appreciated that the guard-cage comprises three concentric annular rings 16, 19 and 20, which are suitably connected together by means of radial members or spokes 17 of which several have their inner ends connected to a central hub member 18, thereby to form a unitary and rigid cage.

The unitary guard-support includes a plurality of substantially radially disposed arms 21 which are connected together in pairs at their inner end portions by means of loops 22 which are adapted to be secured to the motor casing 11, as by means of screws 23. These arms 21, 21 are all secured at their outer ends to an annular wire ring 24, thereby to provide a unitary structure which may be readily applied to or removed from the motor casing 11 through the medium of the screws 23, 23.

Referring particularly to Figs. 4 to 9, inclusive, it is to be understood that the uppermost one of the guard-support arms 21, at its free end portion, is made in the form of a hinge for pivotally supporting the guard-cage in a manner which is best disclosed in Fig. 3. More specifically, and referring particularly to Fig. 4, the free end portion of the hinge arm 21 is provided with a primary U-shaped bend 25 for receiving the cage rim 16, a secondary U-shaped bend 26 disposed substantially at right angles to the bend 25 for receiving a radial arm 17, and a tertiary U-shaped bend 27 for receiving the cage rim 16. It will be readily appreciated that this hinge member is adapted to support the entire cage member in a manner disclosed in Fig. 3 and that the cage member may be removed from the hinge member by merely swinging the cage member substantially 180° in a clockwise direction from the position disclosed in Fig. 3 so that the arm 17 will be free of the bend 26 in a manner as shown in Fig. 9, after which a downward movement of the cage will completely free it of the hinge. The cage is mounted upon the hinge by merely reversing this procedure.

The remaining arm members 21 of the guard-support 14 are each provided at its outer end portion with a hook element 28 which provides a recess 29 which is opened inwardly in a radial direction. The recesses 29, 29 define a circle having a diameter which is slightly less than that of the cage rim 16 so that when the rim 16 is placed within these recesses 29, the arms 21, 21, carrying the hooks 28, 28, will be biased outwardly from their normal positions so as to maintain the cage firmly against the guard support at all times due to the resilient nature of the arms 21, 21. It is also to be understood that the primary and tertiary bends 25 and 27 provided in the hinge member 21 in effect provide an inwardly opening recess which is normally disposed outside the confines of the above defined circle so that whenever the cage member is positioned both within the hinge recess as well as within the hook recess 29, 29, the hinge arm will be drawn inwardly from its normal position so that this arm tends to bias the cage member outwardly while each of the remaining arms 21, 21 tends to bias the cage member inwardly, thereby to prevent any relative movement between the cage 15 and its guard-support 14. Also, it is to be observed from Fig. 3, that the hinge arm has its outer or secondary bent portion 26 inclined relative to a vertical plane so that the cage, when freely mounted upon the hinge, will have its bottom portion spaced from the guard-support. Thus, whenever the cage is positioned within the hook recesses 29, 29, the resilient nature of the hinge arm will tend to bias the cage away from the guard-support, thereby further to prevent any movement between the cage and its support.

Referring particularly to Figs. 2, 3 and 4, it is to be understood that the hinge arm functions in the manner of a handle so that one may grasp the same and carry the fan from one place to another. Due to the fact that the bend 26 of the free end of the hinge lies beneath the upper cage arm 17, the use of the hinge member as a handle will not tend to separate the cage from its guard-support.

From the foregoing, it will be apparent that the present invention provides an improved two-piece fan-guard construction, wherein the guard-cage 15 is secured to its support 14 without the use of any separate fastening devices. This fan-guard may be economically manufactured in large numbers and due to the two-piece construction the various cage and support elements of a group of such guards may be respectively nested together, thereby to facilitate the economical transportation of the parts. The guard-support 14 for the cage 15 is shown in the drawings as carried by the fan motor end-bell, but it will be understood that it may be carried by any other suitable portions of the fan construction. The above described hinge member for pivotally engaging the cage functions, in conjunction with the hook elements 28, 28, to secure the cage to the guard-support and at the same time it functions as a handle whereby the entire fan unit may be manually carried from one position to another. It is also to be noted that since the hinge member engages not only the rim 16 of the cage but one of the arms 17, as well, it maintains the cage in a symmetrical relation at all times relative to the guard unit, thereby improving the general appearance of the fan.

Having thus set forth the nature of the invention, what I claim herein is:

1. In a guard construction for a fan having a motor and fan blades driven thereby, the combination of a cage for encompassing the fan blades and including a circular peripheral rim and a plurality of substantially radially disposed members each having its outer end secured to the inner side of said rim, a guard-support attachable to the motor and including a plurality of arms with the end portion of each arm being formed as a hook for removable engagement with said rim, and a resilient hinge member carried by said guard for pivotally supporting said cage at the junction of said rim and one of said radial members, said hinge member having formed therein a pair of recesses which are disposed substantially at right angles to each other, a first of said recesses being adapted to receive said rim while the other is adapted to receive said one radial member.

2. In a guard construction for a fan having a motor and fan blades driven thereby, the combination of a cage for encompassing the fan blades and including an annular rim and a plurality of radially disposed members each having its one end secured to said rim, a guard-support attachable to the motor, a hinge member carried by said guard-support for pivotally supporting said cage, said hinge member being in the form of a resilient wire arm having two oppositely disposed U-shaped bends formed in the free end portion thereof, one of said U-bends receiving said rim while the other receives one of said radial members, and a plurality of means carried by said guard-support for removable attachment with and at spaced locations about said rim.

3. In a guard construction for a fan having a motor and fan blades driven thereby, the combination of a unitary bowl-shaped cage for encompassing the fan blades and including an annular rim and a plurality of substantially radially disposed members each having its one end secured to said rim, a unitary guard-support attachable to the motor, a hinge member carried by said guard-support for pivotally supporting said cage, said hinge member being in the form of a resilient wire arm having two oppositely disposed U-shaped bends formed in the free end portion thereof, one of said U-bends receiving said rim while the other receives one of said radial members, and a plurality of resilient radially disposed arms carried by said guard-support with the free outer end of each arm being formed as a hook for removable engagement with said rim.

WALTER KRZESIEWSKI.

References Cited in the file of this patent

UNITED STATES PATENTS

| Number | Name | Date |
| --- | --- | --- |
| 1,620,457 | Gatti | Mar. 8, 1927 |
| 1,871,625 | Luff | Aug. 16, 1932 |
| 2,164,608 | Cornelius | July 4, 1939 |
| 2,259,853 | Koch | Oct. 21, 1941 |
| 2,553,172 | Carrick | May 15, 1951 |